J. W. BEHIE.
LINE RIGGING.
APPLICATION FILED OCT. 27, 1921.
1,432,096. Patented Oct. 17, 1922.
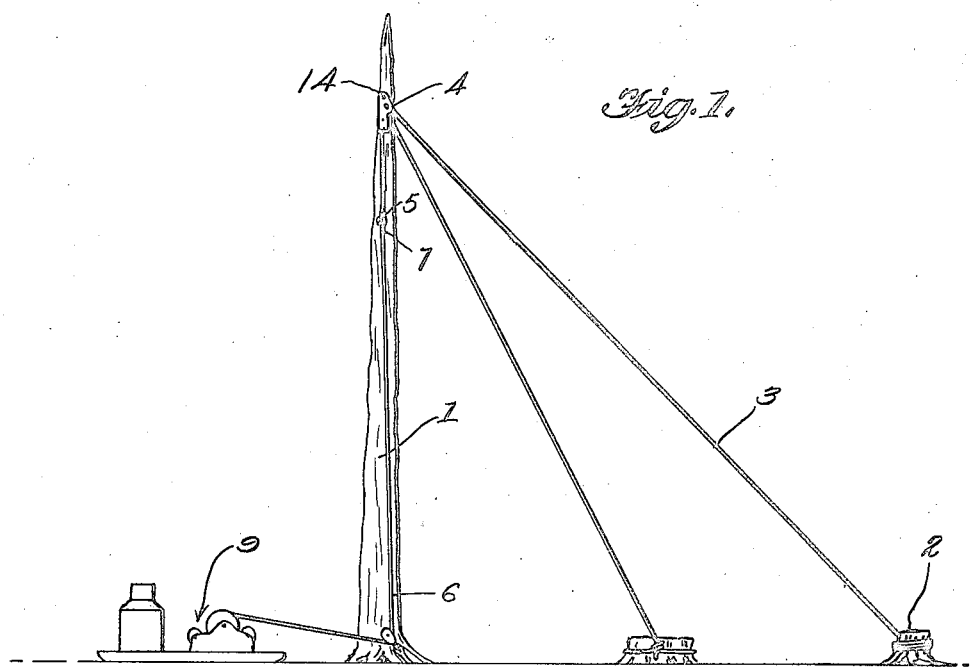
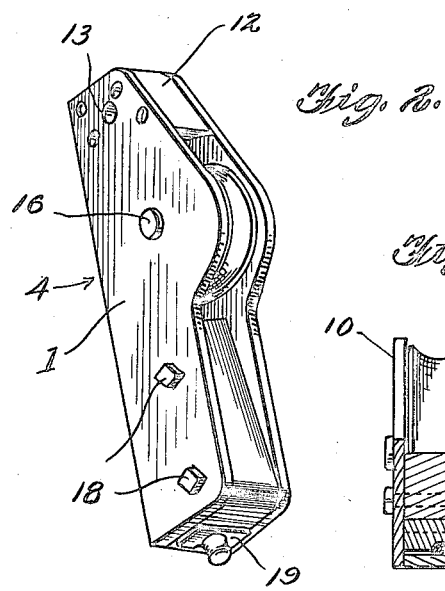
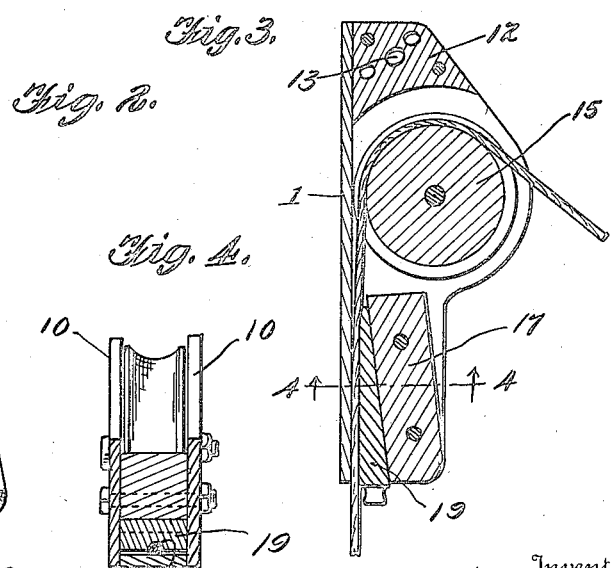
Inventor
John W. Behie.
By Fred P. Lorin
Attorney Patented Oct. 17, 1922.

1,432,096

UNITED STATES PATENT OFFICE.

JOHN WILLIAM BEHIE, OF SNOQUALMIE FALLS, WASHINGTON, ASSIGNOR OF ONE-HALF TO OSCAR ASCHIM, OF KING COUNTY, WASHINGTON.

LINE RIGGING.

Application filed October 27, 1921. Serial No. 510,935.

*To all whom it may concern:*

Be it known that JOHN WILLIAM BEHIE, a citizen of the United States, residing at Snoqualmie Falls, in the county of King and State of Washington, has invented certain new and useful Improvements in Line Rigging, of which the following is a specification.

This invention relates to improvements in methods and apparatus used in logging, and particularly to a method and apparatus used in tightening guy lines on spar trees used in "high lead" and other overhead logging.

In "high lead" logging, a strong tall tree of considerable height, is trimmed of all its limbs for use as a spar tree, after which guy lines are secured to stumps around the tree and spaced therefrom and to the top portion of the tree to brace the same. The tree is also braced at a point about two-thirds of the distance from the bottom up with guy lines secured to the same stumps above mentioned, and at this same point is suspended the block or pulley, through which the line used in loading logs is passed.

The object of this spar tree is to suspend a large block or pulley as above mentioned, through which passes a heavy duty hauling line, which is attached to felled and cut logs at different points distant from the spar tree, so that the logs may be dragged to the base of the tree where they are loaded on cars for shipment to the mill.

Heretofore, the guy lines have usually been secured to the tree first, and then drawn around the stumps at a distance from the base of the tree and spiked to these stumps after being properly tensioned. Considerable difficulty has been experienced in carrying out this method of fastening the guy lines on account of logs and brush being in the way, and the difficulty of spiking the lines to the stumps, and also in leading a line to a donkey engine for tensioning the guys.

By the use of the present invention, these difficulties are overcome by first fastening the guy lines to the stumps and then passing them through specially designed tackle blocks secured at the top portion of the tree, so that a line from the donkey engine located at the base of the tree extends to the top portion and is connected with the guy line, and after properly tensioning the line, the wedge carried by the tackle block may be operated to lock the line therein. By using this method of tightening the guy lines and the specially designed tackle block, considerable time and labor is saved, as well as enabling the tightening operation to be performed and controlled from a single point.

The wedges above mentioned for locking the rope in the tackle blocks, may be operated by a man stationed at the top of the tree, who can drive them in at the proper time, or by means of a small jerk line passing from the wedge through a small pulley at the top of the tree, then down to the base of the tree, so that it may be operated by the engineer handling the donkey engine.

Another object of the invention is to construct the tackle block with a wedge, particularly suitable for use with the above described operations.

The invention is pointed out in its details in the following description and claims:

In the drawings:

Fig. 1 is a view of a spar tree illustrating the new method of rigging a guy line.

Fig. 2 is a perspective view of the tackle block used in connection therewith.

Fig. 3 is a longitudinal section through the block.

Fig. 4 is a sectional view on line 4—4 of Fig. 3.

A spar tree is indicated at 1, which is trimmed up ready to have a conveying cable (not shown) rigged thereto, and a stump 2 has the end of a guy line 3 made fast thereto. The guy line 3 extends upwardly from the stump 2, to the top portion of the spar tree, where it is passed through the specially designed tackle block 4, and then extends downwardly alongside the tree, this end having a splice 5 secured thereon. A line 6 is provided with a hook 7 on the end thereof, which is hooked into the splice 5 on the end of guy line 3, and is then passed through a tackle block 8 to the winding drum of a logging engine 9, which is adapted to be operated to tension the guy line 3 as will be described.

The specially designed tackle block 4 above mentioned has a pair of side walls 10, connected by a bottom wall 11, and at the upper end a block 12 is secured between the walls 10, and has a plurality of openings 13 extending through the block and side walls through which a pin or pins 14 extend to secure the tackle block to the upper end portion of the spar tree 1. A sheave 15 is rotatably mounted on the axle 16 secured in the side walls 10, and below the sheave an abutment block 17 is secured between the walls 10 at angle to the bottom wall 11 by the bolts 18. A wedge 19 is adapted to fit between the abutment block 17 and bottom wall 11, and is formed with a groove 20 in the face adjacent the bottom wall, adapted to receive the guy line 3. The wedge 19 has a projection 21 thereon, which extends below the body of the tackle block to provide a convenient head, against which the force may be applied for driving the wedge in place to lock the guy line. The guy line 3 extending from stump 2, is first passed over sheave 15 and down between block 17 and bottom wall 11, and wedge 19 when in place for locking the guy line against movement in the tackle block engages between block 17 and the guy line and forces the guy line against the bottom wall 11, as shown in Fig. 3.

The parts being rigged as above described and shown in Fig. 1, the logging engine is operated to tension guy line 3, after which an operator stationed at the top of the spar tree drives wedge 19 into place locking the guy line in tensioned position, after which hook 7 may be disengaged from splice 5 and used in connection with another guy line for tensioning or for other purposes as desired.

It will thus be seen that the guy lines may be re-tensioned whenever necessary, utilizing a minimum amount of time and labor.

Claims:
1. A method of rigging a spar tree, consisting in using a plurality of fixtures about the spar tree, fixing the end of a guy line to a fixture and passing it through a locking tackle block fixed at the top portion of the tree and leaving a free end of said line extending below said block, removably securing a power element to the free end of the line and exerting a tension on the entire line therewith, operating the locking device of the tackle block to maintain the tension on the line between the block and the fixture for stabilizing the spar tree, and disconnecting the power element from the free end of the line.

2. A method for rigging spar trees, consisting in using a plurality of fixtures about the spar tree, securing one end of a guy line to each fixture, passing each guy line through a separate locking tackle block secured at the top of the spar tree and leaving the free ends thereof hanging below said blocks, removably securing a tensioning element located near the bottom of the tree to the free ends successively of each guy line, placing the guy line under tension, operating the locking device of the tackle block to lock the line and maintain the tension between the block and the fixture and removing the tensioning element from connection with the guy line, leaving the free end hanging loose, whereby the spar tree may be initially stabilized and also subsequently stabilized by a repeated operation, and the tension holding elements are grouped adjacently.

In testimony whereof I affix my signature.

JOHN WILLIAM BEHIE.